(12) United States Patent
Naraki et al.

(10) Patent No.: US 7,794,680 B2
(45) Date of Patent: Sep. 14, 2010

(54) NITROGEN OXIDE-REDUCING CATALYST AND METHOD FOR REDUCING NITROGEN OXIDE

(75) Inventors: Yusuke Naraki, Shunan (JP); Kou Ariga, Shunan (JP); Hidekazu Aoyama, Shunan (JP)

(73) Assignee: Tosoh Corporation, Yamaguchi (JP)

( * ) Notice: Subject to any disclaimer, the term of this patent is extended or adjusted under 35 U.S.C. 154(b) by 0 days.

(21) Appl. No.: 12/110,833

(22) Filed: Apr. 28, 2008

(65) Prior Publication Data
US 2009/0155152 A1 Jun. 18, 2009

(30) Foreign Application Priority Data
Dec. 18, 2007 (JP) .............................. 2007-325757
Dec. 18, 2007 (JP) .............................. 2007-325758

(51) Int. Cl.
- *B01D 53/56* (2006.01)
- *B01D 53/86* (2006.01)
- *B01J 29/88* (2006.01)
- *C01B 39/06* (2006.01)

(52) U.S. Cl. .................. 423/239.2; 423/239.1; 423/711; 423/713; 502/258; 502/332

(58) Field of Classification Search ............... 423/239.1, 423/239.2, 326, 328.1, 700, 711, 713; 502/258, 502/700
See application file for complete search history.

(56) References Cited

U.S. PATENT DOCUMENTS 4,961,917 A 10/1990 Byrne
5,256,614 A 10/1993 Itoh et al.
5,271,761 A * 12/1993 Skeels et al. .................. 95/116
5,451,387 A 9/1995 Farnos et al.

(Continued)

FOREIGN PATENT DOCUMENTS

EP 0393917 10/1990

(Continued)

OTHER PUBLICATIONS

Perez-Ramirez et al.; Evolution of isomorphously substituted iron zeolites during activiation: comparison of Fe-beta and Fe-ZSM-5; 2005; Journal of catalysis; 232; 318-334.*

(Continued)

*Primary Examiner*—Stuart Hendrickson
*Assistant Examiner*—Syed Iqbal
(74) *Attorney, Agent, or Firm*—Greenblum & Bernstein, P.L.C.

(57) ABSTRACT

A first catalyst for reducing nitrogen oxides comprising a crystalline silicate containing an iron in β-framework structure wherein a $SiO_2/Fe_2O_3$ mol ratio is 20-300 and at least 80% of the contained iron is an isolated iron ion $Fe^{3+}$. A second catalyst for reducing nitrogen oxides comprising a crystalline silicate containing an iron in β-framework structure wherein a $SiO_2/Fe_2O_3$ mol ratio is 20-300 and $\log(SiO_2/Al_2O_3)$ by mol is at least 2. A predominant part of the contained iron is isolated iron ion $Fe^{3+}$ and at least a part thereof preferably has a tetrahedral coordination. These catalysts have high hydrothermal stability and exhibit enhanced activity for reducing nitrogen oxides by a reaction with a reducing agent such as ammonia, urea or an organic amine in a broad temperature range between lower temperature and higher temperature.

4 Claims, 7 Drawing Sheets

U.S. PATENT DOCUMENTS

| | | | |
|---|---|---|---|
| 5,482,692 | A | 1/1996 | Audeh et al. |
| 5,520,895 | A | 5/1996 | Sharma et al. |
| 5,552,129 | A | 9/1996 | Farnos et al. |
| 5,589,147 | A | 12/1996 | Farnos et al. |
| 5,648,558 | A | 7/1997 | Hatano et al. |
| 6,641,788 | B1 * | 11/2003 | Ogawa et al. ............ 423/213.2 |
| 7,022,637 | B2 | 4/2006 | Song et al. |
| 7,182,927 | B2 * | 2/2007 | Tran et al. .................. 423/237 |
| 2002/0044902 | A1 | 4/2002 | Delahay et al. |
| 2006/0088469 | A1 | 4/2006 | Perez-Ramirez |

FOREIGN PATENT DOCUMENTS

| | | |
|---|---|---|
| JP | 2-293021 | 12/1990 |
| JP | 3-269828 | 12/1991 |
| JP | 4-193347 | 7/1992 |
| JP | 5-49864 | 3/1993 |
| JP | 5-154349 | 6/1993 |
| JP | 5-305240 | 11/1993 |
| WO | 02/060581 | 8/2002 |

OTHER PUBLICATIONS

Doronkin, Dmitrii et al.; Nature of active sites in a Fe-beta catalyst for NOx selective catalytic reduction by NH3; 2007; Mendeleev Commun; 17; 309-310.*

Yoo et al. "Phase Diagram of Iron by in Situ X-ray Diffraction: Implications for Earth's Core" Dec. 1995, Science, vol. 270, 1473-1475.*

Doronkin et al. Nature of active sites ina Fe-beta catalyst for Box selective catalytic reduction by NH3, NOv. 2007, Mendeleev Communication, vol. 17, p. 309-310.*

English language Abstract of JP 3-269828.

English language Abstract of JP 02/060581.

English language abstract of JP 7-228684.

English language Abstract of JP 5-305240.

English language Abstract of JP 5-49864.

English language Abstract of JP 5-154349.

English language Abstract of JP 4-193347.

Pérez-Ramirez et al., "Evolution of Isomorphously Substituted Iron Zeolites During Activation: Comparison of Fe-beta and Fe-ZSM-5," Journal of Catalysis, vol. 232, pp. 318-334, 2005.

English language Abstract of JP 2-293021.

Berrier et al., "Temperature-Dependent $N_2O$ Decomposition over Fe-ZSM-5: Identification of Sites with different Activity," Journal of Catalysis, vol. 249, pp. 67-78, 2007.

R. Kumar et al., "Synthesis of Iron-Silicate Analogs of Zeolite Beta", Zeolites, vol. 10, pp. 85-89, 1990.

M. Mauvezin et al., "Catalytic reduction of N2O by NH3 in presence of oxygen using Fe-exchanged zeolites", Catalysis Letters, Springer, Dordrecht, vol. 62, No. 1, Jan. 1, 1999, pp. 41-44.

G. Delahay et al., "Selective Catalytic Reduction of Nitrous Oxide by Ammonia on Iron Zeolite Beta Catalysts in an Oxygen Rich Atmosphere", Journal of Catalysis, vol. 202, No. 1, pp. 156-162 (Aug. 15, 2001).

* cited by examiner

NITROGEN OXIDE-REDUCING CATALYST AND METHOD FOR REDUCING NITROGEN OXIDE

TECHNICAL FIELD

This invention relates to reduction of nitrogen oxides in the exhaust gas from internal combustion engines. More particularly, it relates to a catalyst for reducing nitrogen oxides comprising a ferrosilicate having β-framework structure, and a process for reducing nitrogen oxides comprising reacting nitrogen oxides with at least one of ammonia, urea and an organic amine using the catalyst.

BACKGROUND ART

Silicates having a framework structure containing a substituted heteroatom are expected to have characteristics, different from those of ordinary aluminosilicate zeolites, and their usage for catalytic reaction has been investigating.

As specific examples of such ferrosilicates, a ferrosilicate having platinum supported thereon has been proposed as a catalyst for isomerization of xylene in Japanese Patent 3269828; an ferrosilicate has been proposed as a catalyst for selective methylation of naphthalene compounds in Japanese Translation of PCT International Application 2004-524142 (U.S. Pat. No. 7,022,637), and a method for producing polyalkylene glycol using a ferrosilicate as a catalyst for ring-opening polymerization of a cyclic ether in Japanese patent 3477799 (U.S. Pat. No. 5,648,558).

Technology relating to reduction of nitrogen oxides using an ferrosilicate also has been investigated. Such investigations include, for example, a catalyst for purifying a nitrogen oxides-containing exhaust gas which comprises ZSM-5 type ferrosilicate having dispersed therein a co-precipitated double oxide of copper and gallium in Japanese Published Patent Application H5-305240 (U.S. Pat. No. 5,256,614); a process for reducing nitrogen oxides comprising contacting an alkali metal-exchanged ZSM-5 type ferrosilicate with a nitrogen oxides-containing exhaust gas in the presence of a hydrocarbon or an oxygen-containing compound under an excessive oxygen-containing atmosphere (Japanese Patent 2691643); a method for removing nitrogen oxides wherein exhaust gases containing nitrogen oxides, oxygen gas and, as occasion demands, sulfur dioxide gas are catalytically reacted with an ferrosilicate catalyst and a hydrocarbon reducing agent (Japanese Published Patent Application H5-154349); and, an exhaust gas purifying catalyst for reducing mainly nitrogen oxides which comprises a ferrosilicate having supported thereon at least one metal selected from platinum, palladium, rhodium and cobalt (Japanese Patent 2605956).

The ferrosilicates described in Japanese Published Patent Application H5-154349 and Japanese Patent 2605956 are synthesized using a tetrapropylammonium salt and therefore regarded as having a ZSM-5 structure as the framework structure for ferrosilicate.

With regard to catalysts for reducing nitrous oxide, proposals have also been made, which include, for example, a process for producing a catalyst comprising a β-type ferrosilicate having copper or cobalt supported thereon, which is used for direct decomposition of nitrous oxide (US Patent Application Publication 2006-0088469); a method of directly decomposing nitrous oxide using a β-type ferrosilicate; and a method of non-selectively catalytically reducing nitrous oxide using carbon monoxide as a reducing agent (Journal of Catalysis, 232 (2005) 318-334).

On the other hand, catalysts for reducing nitrogen oxides in a exhaust gas, more specifically, nitrogen oxides in excessive oxygen-containing exhaust gases such as lean-burn exhaust gas or diesel engine exhaust gas, a process for selective catalytic reduction (often referred to as "SCR") of nitrogen oxides using ammonia is well-known (Japanese Published Patent Application H2-293021, U.S. Pat. No. 4,961,917).

However, a satisfactory ferrosilicate catalyst is not known till now, which exhibits high activity for reduction of nitrogen oxides (NOx) at a low temperature and high hydrothermal stability in a process for reducing nitrogen oxides using ammonia as a reducing agent.

DISCLOSURE OF THE INVENTION

In view of the foregoing prior art, an object of the present invention is to provide an ferrosilicate catalyst for reducing nitrogen oxides, which exhibits a high catalytic activity in a broad temperature range, especially in a relatively low temperature range of not higher than 250° C., and has enhanced hydrothermal stability.

Another object of the present invention is to provided a process for reducing nitrogen oxides with enhanced efficiency using the above-mentioned ferrosilicate catalyst.

Thus, in one aspect of the present invention, there is provided a catalyst for reducing nitrogen oxides comprising a crystalline silicate having an iron-containing β-framework structure wherein a $SiO_2/Fe_2O_3$ mol ratio is in the range of 20 to 300 and, without organic structure-directing agent in the micropores ("fresh" state), at least 80% of the contained iron is an isolated iron ion $Fe^{3+}$ (this type of silicate is hereinafter referred to as "β-type ferrosilicate 1").

In another aspect of the present invention, there is provided a catalyst for reducing nitrogen oxides comprising a crystalline silicate having an iron-containing β-framework structure wherein a $SiO_2/Fe_2O_3$ mol ratio is in the range of 20 to 300 and $\log(SiO_2/Al_2O_3)$ by mol is at least 2 by mol (this type of silicate is hereinafter referred to as "β-type ferrosilicate 2").

In a further aspect of the present invention, there is provided a process for reducing nitrogen oxides comprising the step of allowing nitrogen oxides to react with at least one reducing agent selected from the group consisting of ammonia, urea and an organic amine in the presence of a catalyst comprising the above-mentioned β-type ferrosilicate 1 or β-type ferrosilicate 2 whereby the nitrogen oxides are selectively reduced.

MODE FOR CARRYING OUT THE INVENTION

Figure 1:
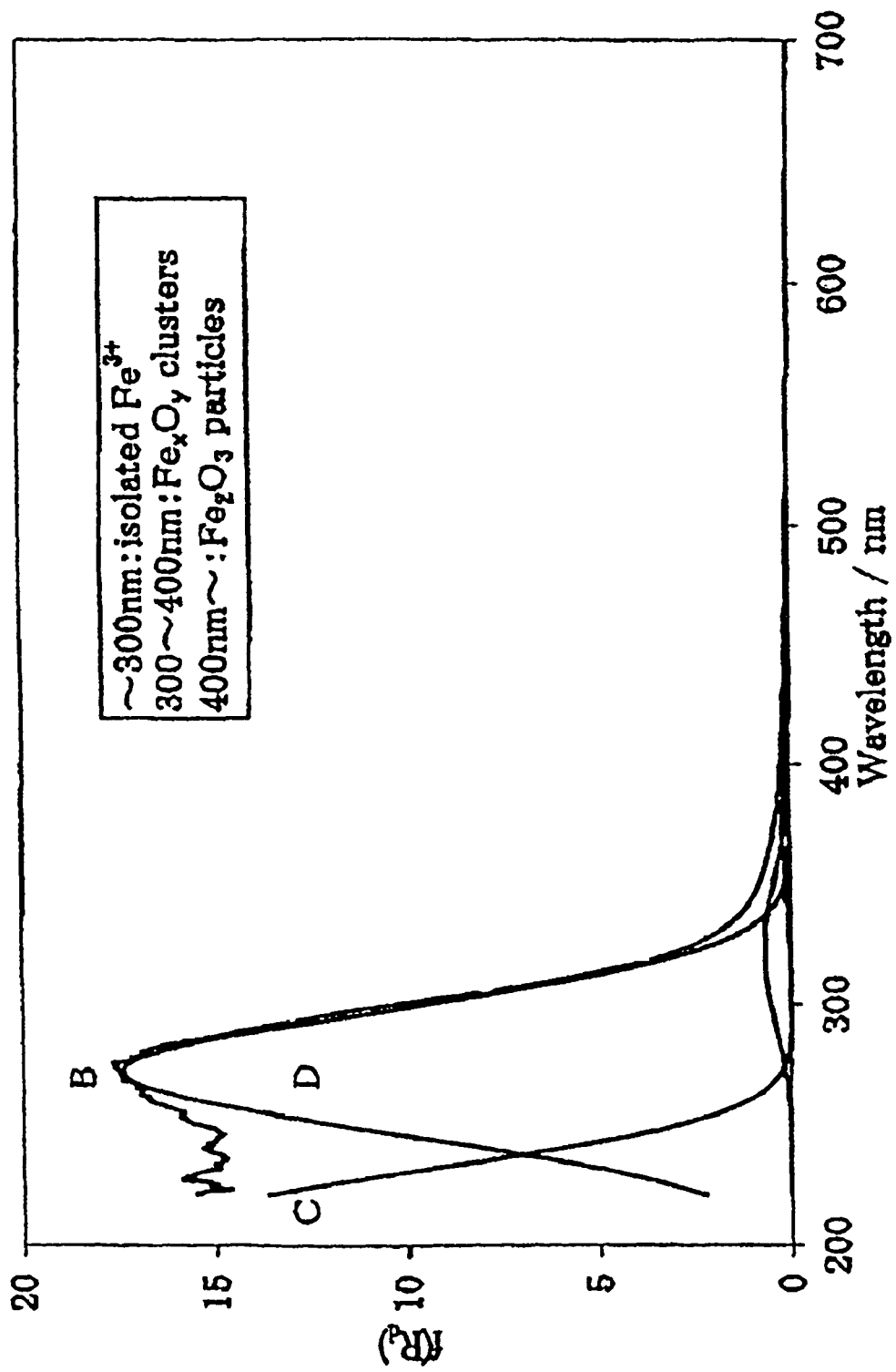
FIG. 1 is an ultraviolet-visible light absorption spectrum of β-type ferrosilicate 1 prepared in Example 3.

The catalyst for reduction of nitrogen oxides according to the present invention will be described in detail.

The β-type ferrosilicate 1 according to the present invention has a composition represented by following formula:

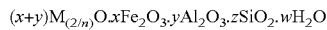

wherein n is an atomic value of cation M; x, y and z represent mol fractions of Fe$_2$O$_3$, Al$_2$O$_3$ and SiO$_2$, respectively; x+y+z=1; w is a number of at least 0; z/x is 20 to 300, and y may be 0.

The β-type ferrosilicate 2 according to the present invention has a composition represented by following formula:

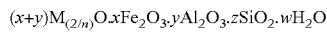

wherein n is an atomic value of cation M; x, y and z represent mol fractions of Fe$_2$O$_3$, Al$_2$O$_3$ and SiO$_2$, respectively; x+y+z=1; w is a number of at least 0; z/x is 20 to 300, z/y is at least 100, and y may be 0.

Both of β-type ferrosilicate 1 and β-type ferrosilicate 2 according to the present invention have a β-type crystalline structure as determined by X-ray diffraction measurement. β-type ferrosilicate is metallosilicate having three-dimensional micropores interconnected by oxygen 12-membered ring channels of 0.76×0.64 nm and 0.55×0.55 nm.

The X-ray diffraction patterns of β-type ferrosilicate 1 and β-type ferrosilicate 2 are characterized as having a lattice plane distance d (angstrom) and a diffraction intensity, shown in Table 1, below.

TABLE 1

| Latice plane distance d (Å) | Peak intensity |
|---|---|
| 11.5 ± 0.4 | medium-strong |
| 7.4 ± 0.2 | weak |
| 6.6 ± 0.15 | weak |
| 4.15 ± 0.10 | weak |
| 3.97 ± 0.10 | very strong |
| 3.0 ± 0.07 | weak |
| 2.05 ± 0.05 | weak |

The β-type ferrosilicate 1 and β-type ferrosilicate 2 according to the present invention are crystalline silicates containing iron in a β-framework structure wherein the SiO$_2$/Fe$_2$O$_3$ ratio by mol is in the range of 20 to 300, preferably 25 to 300.

If the SiO$_2$/Fe$_2$O$_3$ ratio by mol is smaller than 20, the content of iron is large, but, when the silicate is subjected to a hydrothermal treatment, the crystallinity tends to be lowered and the content of catalytically active ingredient, i.e., isolated iron ion Fe$^{3+}$, becomes difficult to maintain at a satisfactorily high level. In view of the crystallinity, the SiO$_2$/Fe$_2$O$_3$ ratio by mol is preferably at least 25. If the SiO$_2$/Fe$_2$O$_3$ ratio by mol exceeds 300, the content of iron ion is too small to obtain a catalytic activity of the desired level.

The β-type ferrosilicate 1 preferably has a SiO$_2$/Fe$_2$O$_3$ ratio by mol in the range of 40 to 150, more preferably 50 to 80.

The β-type ferrosilicate 2 preferably has a SiO$_2$/Fe$_2$O$_3$ ratio by mol in the range of 20 to 150, more preferably 25 to 100.

In the β-type ferrosilicate 1 and β-type ferrosilicate 2 according to the present invention, the iron ingredient most prominently exhibiting a catalytic activity for the reduction of nitrogen oxides is not agglomerated as Fe$_2$O$_3$ but is dispersed as isolated iron ion Fe$^{3+}$ in the framework structure. The SiO$_2$/Fe$_2$O$_3$ ratio by mol as used for defining the composition of the β-type ferrosilicate is an expedient expression for defining the whole iron content including isolated iron ion Fe$^{+3}$ in the β-type ferrosilicate.

In the β-type ferrosilicate 2, log(SiO$_2$/Al$_2$O$_3$) by mol is at least 2. If the log(SiO$_2$/Al$_2$O$_3$) by mol is below 2, when the silicate is subjected to hydrothermal aging, the performance for nitrogen oxide reduction at a lower temperature than 250° C. is drastically decreased.

The upper limit of log(SiO$_2$/Al$_2$O$_3$) by mol is not particularly limited, provided that the log(SiO$_2$/Al$_2$O$_3$) by mol is at least 2 (i.e., the SiO$_2$/Al$_2$O$_3$ ratio by mol is at least 100). The log(SiO$_2$/Al$_2$O$_3$) by mol is preferably at least 2.5 (i.e., the SiO$_2$/Al$_2$O$_3$ ratio by mol is at least 310), more preferably at least 3 (i.e., the SiO$_2$/Al$_2$O$_3$ ratio by mol is at least 1,000). When the log(SiO$_2$/Al$_2$O$_3$) by mol exceeds 4 (i.e., the SiO$_2$/Al$_2$O$_3$ ratio by mol becomes at least 10,000), the performance for nitrogen oxide reduction is constant at the highest level.

Although the active site for catalytic activity for reduction of nitrogen oxides in the ferrosilicate is the isolated iron ion Fe$^{3+}$, it is known that aluminum in the framework structure also exhibits for catalytic activity to some extent. In the ordinary aluminosilicate, the higher the SiO$_2$/Al$_2$O$_3$ ratio is, the higher the thermal stability. However, with a decrease of the content of Al$_2$O$_3$, the solid acid sites decrease and thus the catalytic activity is rather reduced. It would be surprising that the β-type ferrosilicate 2 of the present invention exhibits a high catalytic activity for nitrogen oxide reduction at a relatively low temperature before and after a hydrothermal aging, although it has a SiO$_2$/Al$_2$O$_3$ ratio by mol of at least 2.

The β-type ferrosilicate 1 of the present invention is characterized as that at least 80% of the contained iron is an isolated iron ion Fe$^{3+}$ in the fresh state, i.e., in the state in which an organic structure-directing agent is not contained in the micropores.

The β-type ferrosilicate 1 and β-type ferrosilicate 2 according to the present invention have a structure such that a tetrahedrally coordinated iron as a skeletal atom is bonded to an oxygen atom, and, the tetrahedrally coordinated iron has a function as a solid acid attributed to a shortage of electric charge in the silicate framework, in the same manner as in the ordinary aluminosilicate zeolite. As compared with a catalyst comprising the ordinary aluminosilicate zeolite having iron supported thereon, the ferrosilicate of the present invention is characterized in that the iron ingredient as an active metal for catalytic activity is present in a highly dispersed state as isolated iron Ion Fe$^{3+}$, and thus, when the silicate is used in the selective reduction reaction of nitrogen oxides using a reducing agent such as ammonia, the iron ingredient does not agglomerate and exhibits a high catalytic activity.

The isolated iron ion in the β-type ferrosilicate 1 and β-type ferrosilicate 2 according to the present invention can be measured by the ultraviolet-visible light absorption spectroscopy.

Iron ion or iron oxide exhibit an absorption in the wavelength range of ultraviolet and visible light. The wavelength range in which iron exhibits an absorption varies depending upon the particular state of iron as determined by the ultraviolet-visible light absorption measurement. The absorption in a wavelength range of smaller than 300 nm is attributed to the isolated iron ion Fe$^{3+}$, the absorption in a wavelength range of 300 to 400 nm is attributed to the Fe$_2$O$_3$ cluster, and the absorption in a wavelength range of larger than 400 nm is attributed to agglomerated Fe$_2$O$_3$ particles. That is, the resolved waveforms C and D in the Gaussian curve with peak wavelengths, about 211±10 nm and about 272±10 nm, in the ultraviolet-visible light absorption spectrum is attributed to the absorption due to the isolated iron ion. The isolated iron ion comprises well dispersed $Fe^{3+}$ mainly located in the framework structure or ion-exchange sites of β-type ferrosilicate.

The ratio of isolated iron ion is determined by the following formula ratio according to the ultraviolet-visible light absorption measurement in a wavelength of 220 to 700 nm.

Ratio $A$ of isolated iron ion=$(C+D)/B$ wherein B is the total integrated absorption intensity, C is integrated absorption intensity at a peak wavelength of 211±10 nm, and D is integrated absorption intensity at a peak wavelength of 272±10 nm.

The ratio of isolated iron ion in a β-type ferrosilicate containing agglomerated iron outside the framework structure and exhibiting a low catalytic activity for nitrogen oxide reduction is small. The β-type ferrosilicate 1 of the present invention has a ratio A of at least 80%, that is, at least 80% of the contained iron is isolated iron ion $Fe^{3+}$. The ratio A of isolated iron ion is preferably at least 90% and more preferably at least 95%. The upper limit in the ratio of isolated iron ion does not exceed 100% theoretically.

The ultraviolet-visible light absorption measurement is carried out by the following, generally adopted method.

The ultraviolet-visible light absorption measurement is carried out using an autographic spectrophotometer (for example, "UV-3100" available from Shimadzu Corporation) equipped in the sample chamber with an integrating sphere attachment (for example, "ISR-3100" available from Shimadzu Corporation). Scanning speed is 200 nm/min, and the slit width is 5.0 nm. Barium sulfate powder is used for correction of a base line. A sample holder is packed with the barium sulfate powder, and light reflectance is measured in a wavelength range of 220 to 700 nm.

The β-type ferrosilicate, as hydrothermally synthesized, contains an organic structure directing agent (SDA) such as tetraethylammonium cation in the micropores. Therefore, the ultraviolet-visible light absorption measurement is usually carried out after the β-type ferrosilicate is subjected to fresh calcination (that is, calcined, for example, at a temperature of 600° C. in a dry air or nitrogen atmosphere) whereby SDA is removed.

In β-type ferrosilicate 1 according to the present invention, at least 80% of the contained iron is an isolated iron ion $Fe^{3+}$. The isolated iron ion $Fe^{3+}$ preferably has a tetrahedral coordination. Preferably at least 20% of the contained iron is an isolated iron ion $Fe^{3+}$ having a tetrahedral coordination.

In β-type ferrosilicate 2 according to the present invention, at least 90% of the contained iron is an isolated iron ion $Fe^{3+}$. The isolated iron ion $Fe^{3+}$ also preferably has a tetrahedral coordination for the desired activity for nitrogen oxide reduction.

The content of the isolated iron ion $Fe^{3+}$ having a tetrahedral coordination is preferably at least 60% based on the total iron contained in the β-type ferrosilicate. The upper limit in the content of isolated iron ion does not exceed 100% theoretically.

The isolated iron ion $Fe^{3+}$ as used herein does not refer to agglomerated iron such as iron oxide ($Fe_2O_3$) but refers to iron ions which are isolated and dispersed in the silicate frame structure or ion exchange sites. More specifically the isolated iron ion $Fe^{3+}$ refers to iron ions which can be detected by the electron spin resonance measurement.

The structural symmetry of the iron ingredient can be measured by the electron spin resonance analysis at a temperature of 77K.

A paramagnetic iron ion $Fe^{3+}$ exhibits resonance absorption at the electron spin resonance measurement with at least three peaks occurring at g=about 2.0, g=about 4.3 and g>4.3 (see, for example, Journal of Catalysis, 249 (2007) 67). The iron ion having a peak occurring at g=about 2.0 is attributed to an isolated iron ion $Fe^{3+}$ having a tetrahedral coordination, or a highly symmetric multi-coordination. The iron ion having a peak occurring at g=about 4.3 and g>4.3 is attributed to an isolated iron ion $Fe^{3+}$ having a distorted tetrahedral coordination, or a distorted multi-coordination.

The above-mentioned feature that at least 20% of the contained iron is an isolated iron ion $Fe^{3+}$ having a tetrahedral coordination in the β-type ferrosilicate 1, and the above-mentioned feature that at least 60% of the contained iron is an isolated iron ion $Fe^{3+}$ having tetrahedral coordination in the β-type ferrosilicate 2, are determined by multiplying the content of isolated iron ion $Fe^{3+}$ as measured by the ultraviolet-visible light absorption analysis by the content of isolated iron ion $Fe^{3+}$ having a tetrahedral coordination as measured by the electron spin resonance analysis.

The feature that the content of isolated iron ion $Fe^{3+}$ having a tetrahedral coordination is at least 70% of the total isolated iron ion $Fe^{3+}$ in the β-type ferrosilicate 2 at the electron spin resonance measurement means that the intensity of electron spin resonance spectrum at g=about 2.0 is at least 70% of the total intensity of electron spin resonance spectrums at g=about 2.0, g=about 4.3 and g>4.3.

The electron spin resonance spectrum is often evaluated by the differential curve of derivative spectroscopy. Therefore, the intensity of the electron spin resonance spectrum is determined by calculating from the peak-to-peak height of the differential curve. That is, the ratio of isolated iron ion $Fe^{3+}$ having a tetrahedral coordination is determined by dividing the peak-to-peak height of the differential curve at peak of g=about 2.0 in the electron spin resonance spectrum by the sum of the peak-to-peak heights of the differential curve at peaks of g=about 2.0, g=about 4.3 and g>4.3.

The electron spin resonance (ESR) spectrum of the β-type ferrosilicate according to the present invention can be measured by the general method. For example, the ESR spectrum can be measured using an electron spin resonance apparatus "JES-TE200" available from JEOL Ltd. under the following conditions, measurement temperature: 77K, microwave output: 1.0 mW, measurement range: 0 to 1,000 mT, modulation amplitude: 0.32 mT, time constant: 0.3 sec. About 10 mg of a sample is weighed out in a quartz sample tube, and the sample tube is placed in a dewar vessel for liquid nitrogen temperature measurement.

In the present invention, β-type ferrosilicate is calcined at a temperature of about 600° C. in dry air or nitrogen atmosphere to remove SDA from the micropores (fresh state), and then the ESR spectrum measurement is carried out at a temperature of 77K.

In the β-type ferrosilicate 1 and β-type ferrosilicate 2 according to the present invention, the peak intensity of the differential curve of the ESR spectrum (as obtained at 77 K) attributed to g of about 2.0 is preferably larger than any of peak intensities of the differential curves attributed to g=about 4.3 and g>4.3.

In the β-type ferrosilicate 1 according to the present invention, an isolated iron ion $Fe^{3+}$ having a tetrahedral coordination is preferably at least 20% of the contained iron, and more preferably at least 30% of the contained iron. Theoretically the ratio of the isolated iron ion $Fe^{3+}$ having a tetrahedral coordination does not exceed 100%.

In the β-type ferrosilicate 2 according to the present invention, an isolated iron ion $Fe^{3+}$ having a tetrahedral coordination is preferably at least 70% of the isolated iron ion $Fe^{3+}$, and more preferably at least 80% of the isolated iron ion $Fe^{3+}$. Theoretically the ratio of the isolated iron ion $Fe^{3+}$ having a tetrahedral coordination does not exceed 100%.

In the β-type ferrosilicate 2 according to the present invention, an isolated iron ion $Fe^{3+}$ having a tetrahedral coordination is preferably at least 60% of the contained iron, and more preferably at least 70% of the contained iron. Theoretically the ratio of the isolated iron ion $Fe^{3+}$ having a tetrahedral coordination does not exceed 100%.

The absolute content of isolated iron ion as determined by ultraviolet-visible light absorption measurement can be increased by supporting iron on the β-type ferrosilicate after the preparation of β-type ferrosilicate. However, such iron ion is not substituted within the framework of silicate and a predominant part thereof does not have a tetrahedral coordination. Thus, such iron ion does not exhibit greatly improved catalytic activity for reduction of nitrogen oxides. In other words, in the case when the β-type ferrosilicate of the present invention contains a minor portion of isolated iron ion as determined by ultraviolet-visible light absorption measurement, even if the iron content is increased, the resulting β-type ferrosilicate does not exhibit greatly increased catalytic activity.

The β-type ferrosilicate 1 of the present invention may be an iron aluminosilicate containing aluminum in the framework structure. In such iron aluminosilicate, the $SiO_2/Al_2O_3$ mol ratio is not particularly limited. However, a high $SiO_2/Al_2O_3$ mol ratio is preferable in view of enhanced durability (especially high catalytic activity at a low temperature after hydrothermal aging). More specifically the $SiO_2/Al_2O_3$ mol ratio is preferably at least 40, more preferably at least 70, provided that the silicate contains iron ion $Fe^{3+}$ in the required amount mentioned above.

The β-type ferrosilicate 1 of the present invention exhibits a high activity for reduction of nitrogen oxides even after hydrothermal aging is carried out. In other words, even after hydrothermal aging, the β-type ferrosilicate 1 contains a large amount of an isolated iron ion having a tetrahedral coordination.

In the β-type ferrosilicate 1 according to the present invention, an isolated iron ion $Fe^{3+}$ is preferably at least 50% of the contained iron, and more preferably at least 60%, and especially more preferably at least 70% even after hydrothermal aging.

Then, "hydrothermal aging" according to this invention is a usual treatment for evaluation of hydrothermal stability of silicate catalyst, and indicates a thermal treatment carried out in a high temperature atmosphere containing $H_2O$. Such an aging is, for example, carried out by setting a silicate catalyst in a reactor tube and streaming air containing $H_2O$ at 700° C. for 20 hours.

In the β-type ferrosilicate 1 according to the present invention, an isolated iron ion $Fe^{3+}$ having a tetrahedral coordination is preferably larger than 15% of the contained iron, and more preferably at least 20% even after hydrothermal aging.

In the β-type ferrosilicate 2 of the present invention, the content of an isolated iron ion $Fe^{3+}$ having a tetrahedral coordination as expressed by the ratio $Fe^{3+}/(Si+Al+Fe)$ by mol is preferably at least 2%. It is to be noted that, even in the case when the ratio $Fe^{3+}/(Si+Al+Fe)$ by mol is large, the catalytic activity for reduction of nitrogen oxides is rather low, if the absolute amount of isolated iron ion having a tetrahedral coordination is minor.

The absolute amount of isolated iron ion having a tetrahedral coordination is expressed as a product of the molar ratio $Fe/(Si+Al+Fe)$ in the β-type ferrosilicate, a ratio of isolated iron ion as measured by ultraviolet-visible light absorption spectrum and a ratio of isolated iron ion having a tetrahedral coordination to the isolated iron ion as determined by electron spin resonance measurement.

In the β-type ferrosilicate 2 of the present invention, the content of an isolated iron ion $Fe^{3+}$ having a tetrahedral coordination as expressed by the ratio $Fe^{3+}/(Si+Al+Fe)$ by mol is preferably at least 2%, more preferably at least 2.2%. It is to be noted, however, that the lower limit of the $SiO_2/Fe_2O_3$ ratio by mol is 20 (Si/Fe mol ratio=10), and therefore, the upper limit of the absolute content of isolated iron ion having a tetrahedral coordination is about 9.1 $[1/(10+0+1)]$% by mol.

The β-type ferrosilicate 2 of the present invention exhibits a high activity for reduction of nitrogen oxides even after hydrothermal aging. In other words, even after hydrothermal aging, the β-type ferrosilicate 2 contains large amount of an isolated iron ion having a tetrahedral coordination.

In the β-type ferrosilicate 2 according to the present invention, a ratio of an isolated iron ion $Fe^{3+}$ having a tetrahedral coordination based on the isolated iron ion $Fe^{3+}$ being detectable by electron spin resonance measurement is preferably larger than 40%, and more preferably at least 80%, especially more preferably at least 90% even after hydrothermal aging.

In the β-type ferrosilicate 2 according to the present invention, an isolated iron ion $Fe^{3+}$ having a tetrahedral coordination is preferably larger than 20% of the contained iron, and more preferably at least 40%, especially more preferably at least 50% even after hydrothermal aging.

The absolute amount of isolated iron ion having a tetrahedral coordination in the β-type ferrosilicate 2 of the present invention is preferably larger than 0.6% by mol, more preferably at least 1% by mol and especially preferably 1.5% by mol, even after hydrothermal aging.

The ratio of isolated iron ion in the β-type ferrosilicate 2 of the present invention is preferably larger than 50% of contained iron even after hydrothermal aging. More preferably the isolated iron ion has tetrahedral coordination as mentioned above.

Now the processes for producing the β-type ferrosilicate 1 and β-type ferrosilicate 2 of the present invention will be described.

The β-type ferrosilicate 1 according to the present invention can be prepared by introducing a sufficient amount of isolated iron ion $Fe^{3+}$ having a tetrahedral coordination in an ferrosilicate framework structure. The content of such isolated iron ion $Fe^{3+}$ having a tetrahedral coordination can be controlled by the mol ratio of iron to be introduced in the silicate framework structure.

The β-type ferrosilicate 2 according to the present invention can be prepared by crystallizing a β-type ferrosilicate composition capable of giving the β-type ferrosilicate 2 having a $SiO_2/Fe_2O_3$ mol ratio in the range of 20 to 300 and $\log(SiO_2/Al_2O_3)$ of at least 2 by mol. By crystallizing the β-type ferrosilicate under such conditions, isolated iron ion $Fe^{3+}$ can be well dispersed in the framework structure of a β-type ferrosilicate and isolated iron ion $Fe^{3+}$ having highly symmetric tetrahedral coordination can be incorporated.

If the content of iron is too large, the iron tends to be easily agglomerated at fresh treatment or hydrothermal aging, and the incorporation of isolated iron ion $Fe^{3+}$ having a tetrahedral coordination is insufficient and the crystallinity of β-type ferrosilicate is liable to be low.

It is expected that Al and Fe incorporation into the β framework is subject to conflicting reaction, but, the amount of Al is less as compared with that of Fe in the β-type ferrosilicate 2 according to this invention, and therefore, such a low level of Al contributes to enhancement of ratio of isolated iron ion $Fe^{3+}$ having a tetrahedral coordination to the desired level.

The raw materials for synthesis include a silica source, an iron source, SDA and water, and, as occasion demands, further include an aluminum source and a fluorine source.

As examples of the silica source, there can be mentioned colloidal silica, amorphous silica, sodium silicate, tetraethylorthosilicate and aluminosilicate gel. As examples of the iron source, there can be mentioned iron nitrate, iron chloride, iron sulfate and metallic iron.

As specific examples of the SDA, at least one compound selected from a group consisting of compounds having a tetraethylammonium cation such as tetraethylammonium hydroxide, tetraethylammonium bromide and tetraethylammonium fluoride, octamethylenebisquinuclidium, α,α-diquinuclidium-p-xylene, α,α'-diquinuclidium-m-xylene, α,α'-diquinuclidium-o-xylene, and compounds containing 1,4-diazabicyclo[2,2,2]octane cation, 1,3,3,N,N-pentamethyl-6-azoniumbicyclo[3,2,1]octane cation or N,N-diethyl-1,3,3-trimethyl-6-azoniumbicyclo[3,2,1]octane cation can be used.

As specific examples of the aluminum source, aluminum sulfate, sodium aluminate, aluminum hydroxide, aluminum nitrate, aluminosilicate gel and metallic aluminum. As specific examples of the fluorine source, there can be mentioned hydrofluoric acid, sodium fluoride, potassium fluoride, ammonium fluoride and tetraethylammonium fluoride etc. can be used.

These raw materials preferably have a form such that they can be uniformly mixed together with other raw materials.

Typical examples of composition of raw materials used for preparing the β-type ferrosilicate 1 according to the present invention are summarized as follows.

$SiO_2/Al_2O_3$ mol ratio: 15 to 30,000, preferably 30 to 100
$SiO_2/Fe_2O_3$ mol ratio: 20 to 300, preferably 20 to 100
$H_2O/SiO_2$ mol ratio: 5 to 50, preferably 5 to 10
$SDA/SiO_2$ mol ratio: 0.1 to 5, preferably 0.1 to 1
$F/SiO_2$ mol ratio: 0 to 5, preferably 0 to 1

Typical examples of composition of raw materials used for preparing the β-type ferrosilicate 2 according to the present invention are summarized as follows.

$SiO_2/Al_2O_3$ mol ratio: at least 15. No addition of $Al_2O_3$ available.
$SiO_2/Fe_2O_3$ mol ratio: 20 to 300, preferably 20 to 100
$H_2O/SiO_2$ mol ratio: 5 to 50, preferably 5 to 10
$SDA/SiO_2$ mol ratio: 0.1 to 5, preferably 0.1 to 1
$F/SiO_2$ mol ratio: 0 to 5, preferably 0 to 1

The composition of raw materials for the preparation of the β-type ferrosilicate 1 and β-type ferrosilicate 2 according to the present invention is not particularly limited provided that this composition can be optionally determined in order to obtain the final composition of the prepared β-type ferrosilicates satisfying the requirements of the present invention.

For the preparation of β-type ferrosilicates of the present invention, an ingredient having a function of promoting crystallization, such as seed crystal, may be used, and the conditions under which crystals with a large particle size are produced can preferably be adopted.

The β-type ferrosilicate 1 and β-type ferrosilicate 2 according to the present invention can be prepared by a process wherein water, a silica source, an iron source, SDA, and optional aluminum source and fluorine source are mixed together and the mixture is crystallized in a closed pressure vessel at a temperature of 100° C. to 180° C.

The crystallization can be effected while the raw material mixture is stirred, or in a static state. Preferably the crystallization is effected in a static state. After the completion of crystallization, the product is left to stand to be thereby thoroughly cooled. Then the product is subjected to a solid-liquid separation, and the crystal is washed with a sufficient amount of water and then dried at a temperature of 110° C. to 150° C. to give the β-type ferrosilicate 1 or β-type ferrosilicate 2 of the present invention.

The β-type ferrosilicate 1 and β-type ferrosilicate 2 of the present invention preferably have a large crystal particle diameter (as measured by SEM observation). The SEM particle diameter is at least 5 μm, preferably at least 7 μm and more preferably at least 10 μm. A large particle diameter is obtainable when the crystallization is carried out without stirring.

The β-type ferrosilicate 1 and β-type ferrosilicate 2 of the present invention contain an active isolated iron ion and therefore can be used as they are as a catalyst for reduction of nitrogen oxides. However, the as-synthesized β-type ferrosilicate 1 and β-type ferrosilicate 2 contain SDA within the micropores, and therefore these β-type ferrosilicate are preferably used for the reduction of nitrogen oxides after SDA is removed therefrom.

For the removal of SDA, a liquid treatment using an acid solution or a solution containing an SDA decomposing agent, an ion exchange treatment using an ion-exchanging resin, or a thermal decomposition treatment can be adopted, for example. These treatments may be adopted either alone or as a combination of at least two thereof. Utilizing the ion-exchanging property of the β-type ferrosilicate, these silicates can be converted to H-type or $NH_4$-type prior to the use for reduction of nitrogen oxides.

The metal species supported on the β-type ferrosilicate are not particularly limited, and include, for example, metal elements selected from groups 8, 9, 10 and 11 of the periodic table. More specifically the metal species are selected from iron, cobalt, palladium, iridium, platinum, copper, silver and gold. Preferably the metal species are selected from iron, palladium, platinum, copper and silver. These metals may be used either alone or as a combination of at least two thereof.

A promoter ingredient such as rare earth metals, titanium and zirconia may be additionally used.

The method by which the metal species is supported on the β-type ferrosilicate is not particularly limited, and includes, for example, an ion-exchange method, an impregnation method, an evaporation method, a precipitating method and a physical mixing method. The raw materials for the metal species to be supported include, for example, nitrate salts, sulfate salts, acetate salts, chlorides, complex salts and multiple oxides.

The amount of metal species to be supported is not particularly limited, but is preferably in the range of 0.1 to 10% by weight.

The catalyst of the present invention can be used after it is mixed with a binder and the mixture is molded. The binder includes clay minerals such as kaoline, atapulgite, montmorillonite, bentonite, allophane and sepiolite. A honeycomb structure made of cordierite or metal may be wash-coated with the catalyst.

The reduction of nitrogen oxides using the catalyst comprising the above-mentioned β-type ferrosilicate of the present invention can be carried out by a process comprising the step of allowing nitrogen oxides to react with at least one reducing agent selected from ammonia, urea and an organic amine in the presence of the β-type ferrosilicate catalyst, whereby the nitrogen oxides are selectively reduced.

The nitrogen oxides to be reduced using the catalyst according to the present invention include nitrogen monoxide, nitrogen dioxide and a mixture thereof. Any exhaust gas containing nitrogen oxides can be treated for reduction of nitrogen oxides. The concentration of nitrogen oxides in the exhaust gas is not particularly limited.

The reducing agent can be added by any addition method. For example, the reducing agent in a gas state can be directly added; a liquid such as an aqueous solution containing the reducing agent can be atomized whereby the reducing agent is evaporated; or, the liquid such as the aqueous solution is atomized at a high temperature to cause thermal decomposition. The amount of reducing agent can be appropriately chosen so that the nitrogen oxides are reduced to the desired extent.

The exhaust gas may contain ingredients other than nitrogen oxides. Such ingredients include, for example, hydrocarbons, carbon monoxide, carbon dioxide, hydrogen, nitrogen, oxygen, sulfur oxides and water. As specific examples of the exhaust gas, there can be mentioned exhaust gases such as those from diesel cars, gasoline automobiles, boilers and gas turbines.

When the exhaust gas is contacted with the catalyst comprising the β-type ferrosilicate of the present invention in the process for reducing nitrogen oxides, the space velocity of exhaust gas ($m^3$/h) to catalyst ($m^3$) is preferably in the range of 500 to 500,000 $hr^{-1}$, more preferably 2,000 to 300,000 $hr^{-1}$.

The β-type ferrosilicate 1 and β-type ferrosilicate 2 of the present invention exhibits a high catalytic activity for the reduction of nitrogen oxides in a broad temperature range, especially in a relatively low temperature range of not higher than 250° C., and has enhanced hydrothermal stability.

EXAMPLES

The invention will now be described specifically by the following examples that by no means limit the scope of the invention.

(Ultraviolet-Visible Light Absorption Analysis)
The measurement of ultraviolet-visible light absorption analysis was carried out under the following conditions.
Integrating sphere attachment: ISR-3100 available from Shimadzu Corporation
Autographic spectrophotometer: UV-3100 available from Shimadzu Corporation
Scanning speed: 200 nm/min
Slit width: 5.0 nm
Baseline correction: barium sulfate powder
Wavelength range: reflectance measured in the range of 220 to 700 nm
Specimen pre-treatment: calcination at 600° C. in dry air (Fresh calcination)

(Electron Spin Resonance Analysis)
The electron spin resonance was carried under the following conditions.
Measurement temperature: 77K
Microwave output: 1.0 mW
Measurement range: 0 to 1,000 mT
Modulation width: 0.32 mT
Time constant: 0.3 sec
Amount of sample: about 10 mg (Test for Reducing Nitrogen Oxides)
Ferrosilicate powders prepared in the examples and the comparative examples were press-molded and then pulverized into a powder with particle size of 12 to 20 meshes. An atmospheric pressure fixed bed flow reactor was packed with 1.5 cc of the ferrosilicate powder. A gas having the composition shown in Table 2, below, was passed through the thus-prepared catalyst layer at a flow rate of 1,500 cc/min. The removal ratio of nitrogen oxide was measured under steady state at an optional temperature.

TABLE 2

| Gas | Concentration |
|---|---|
| NO | 200 ppm |
| $NH_3$ | 200 ppm |
| $O_2$ | 10 vol % |
| $H_2O$ | 3 vol % |
| $N_2$ | Balance |

The activity percent for removal of nitrogen oxide is expressed by the following formula.

$$X_{NOx}=[([NOx]_{in}-[NOx]_{out})/[NOx]_{in}]\times 100(\%)$$

wherein $X_{NOx}$ is a percent for removal of nitrogen oxide, $[NOx]_{in}$ is a concentration of nitrogen oxide in a gas flowing into the reactive tube, and $[NOx]_{out}$ is a concentration of nitrogen oxide in a gas flowing out from the reactor.

The activity percent for removal of nitrogen oxide of ferrosilicate powder as measured after hydrothermal aging was determined as follows.

An atmospheric pressure fixed bed flow reactor was packed with 3 cc of each ferrosilicate catalyst. Air containing 10 vol. % of moisture was passed through the catalyst-packed reaction tube at a flow rate of 300 cc/min at 700° C. for 20 hours. Then the activity percent for removal of nitrogen oxide was measured by the above-mentioned procedure.

The following examples 1 to 3 are drawn to the preparation and evaluation of the β-type ferrosilicate 1 of the present invention.

Example 1

18.79 g of aluminum nitrate nine hydrates and 4.63 g of iron nitrate nine hydrates were dissolved in 257 g of an aqueous 35% tetraethylammonium hydroxide solution (hereinafter referred to as "TEAOH"). To the thus-obtained solution, 209 g of tetraethylorthosilicate (TEOS) was added, and the mixture was thoroughly stirred at room temperature to be thereby hydrolyzed. The produced ethanol was evaporated and then a required amount of water was evaporated. To the reaction mixture, 20.88 g of 48% hydrofluoric acid was added, and the resulting mixture was thoroughly mixed in a mortar. The reaction mixture was put into a stainless steel autoclave and was heated at 150° C. for 240 hours to be thereby crystallized. The composition of the reaction mixture was 40SiO$_2$:Al$_2$O$_3$:0.23Fe$_2$O$_3$:20HF:24.4TEAOH:300H$_2$O. The crystallized slurry mixture was white. The mixture was then filtered, and the solid was washed with pure water and then dried at 110° C. The thus-obtained dry powder was calcined at 600° C. for 2 hours.

X-ray diffraction measurement of the thus-obtained β-type ferrosilicate showed a X-ray diffraction pattern shown in Table 1. ICP atomic emission spectrochemical analysis showed that the SiO$_2$/Al$_2$O$_3$ mol ratio was 41 and the SiO$_2$/Fe$_2$O$_3$ mol ratio was 166. The crystal particles had an average diameter of about 10 μm.

Example 2

A reaction mixture to be crystallized was prepared by the same procedure described in Example 1 except for the composition of the mixture that was changed as follows. 70SiO$_2$:Al$_2$O$_3$:0.47Fe$_2$O$_3$:35HF:42TEAOH:490H$_2$O. The reaction mixture was put into a stainless steel autoclave and was heated at 150° C. for 160 hours to be thereby crystallized. The crystallized slurry mixture was white. The mixture was then filtered, and the solid was washed with pure water and then dried at 110° C. The thus-obtained dry powder was calcined at 600° C. for 2 hours.

X-ray diffraction measurement of the β-type ferrosilicate showed a X-ray diffraction pattern shown in Table 1.

Example 3

A reaction mixture to be crystallized was prepared by the same procedure described in Example 1 except for the composition of the mixture that was changed as follows. 70SiO$_2$:Al$_2$O$_3$:Fe$_2$O$_3$:35HF:42TEAOH:490H$_2$O. The reaction mixture was put into a stainless steel autoclave and was heated at 150° C. for 240 hours to be thereby crystallized. The crystallized slurry mixture was white. The mixture was then filtered, and the solid was washed with pure water and then dried at 110° C. The thus-obtained dry powder was calcined at 600° C. for 2 hours.

X-ray diffraction measurement of the β-type ferrosilicate showed a X-ray diffraction pattern shown in Table 1.

Figure 2:
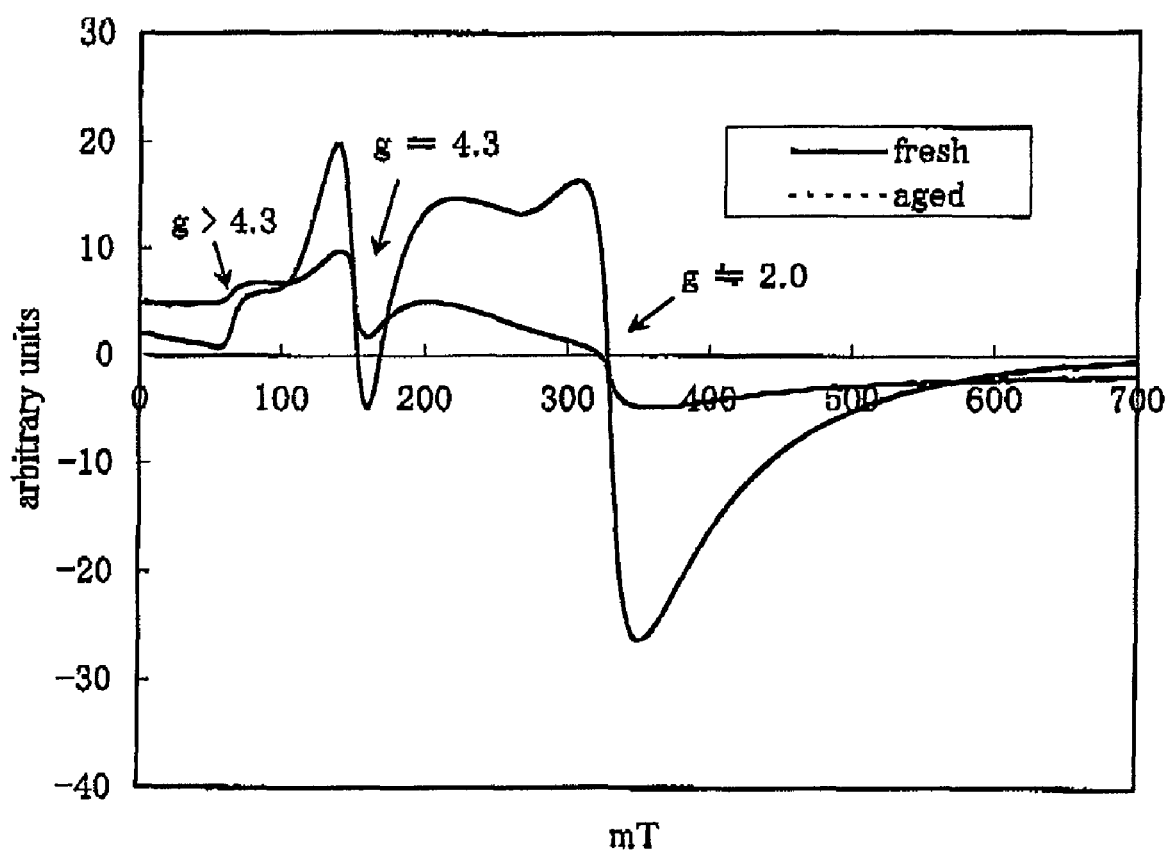
FIG. 2 is an electron spin resonance (ESR) spectrum of β-type ferrosilicate 1 prepared in Example 3, as analyzed before and after aging.

An ultraviolet-visible light absorption spectrum of the β-type ferrosilicate 1 as obtained before hydrothermal aging is shown in FIG. 1. An electron spin resonance (ESR) spectrum of the β-type ferrosilicate, as analyzed before and after hydrothermal aging, is shown in FIG. 2.

Comparative Example 1

β-type zeolite ("HSZ-940NHA" available from Tosoh Corporation) having an SiO$_2$/Al$_2$O$_3$ mol ratio of 40 was calcined at 600° C. in a stream of dry air. X-ray diffraction measurement of the calcined β-type zeolite gave an X-ray diffraction pattern shown in Table 1. ICP atomic emission spectrochemical analysis showed that the SiO$_2$/Al$_2$O$_3$ mol ratio was 40. The β-type zeolite was impregnated with a precisely weighted aqueous solution of Fe(NO$_3$)$_3$.9hydrate so that 3% by weight of iron was supported on the zeolite. The thus-obtained zeolite powder was calcined at 500° C. in the air.

The amount of iron contained in the zeolite was large, but, the content of isolated iron ion as determined by ultra-visible light absorption measurement was 38%. That is, the predominant part of iron was agglomerated.

Figure 3:
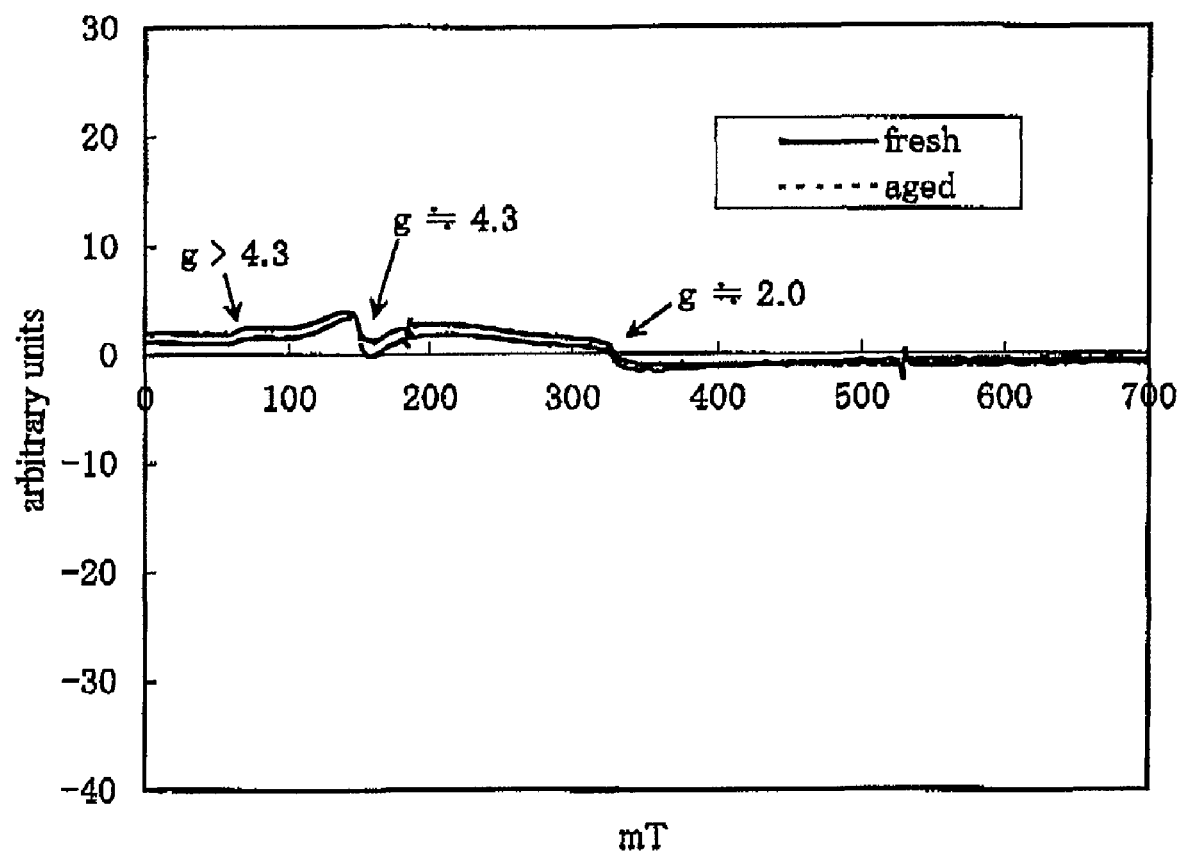
FIG. 3 is an electron spin resonance (ESR) spectrum of iron-loaded β zeolite prepared in Comparative Example 3, as analyzed before and after aging.

An electron spin resonance (ESR) spectrum of the iron-loaded β zeolite, as analyzed before and after hydrothermal aging, is shown in FIG. 3.

Comparative Example 2

1.26 g of aluminum hydroxide, 8.36 g of iron nitrate, 62.8 g of amorphous silica powder ("Nipsil VN-3" available from TOSOH SILICA CORPORATION) and 172 g of water were added to 235 g of an aqueous 35% TEAOH solution, and the mixture was thoroughly stirred. The composition of the reaction mixture was 90SiO$_2$:Al$_2$O$_3$:Fe$_2$O$_3$:54TEAOH:1800H$_2$O. The reaction mixture was packed in a stainless steel autoclave, and heated to 150° C. and maintained at that temperature for 96 hours to be thereby crystallized. The crystallized slurry mixture was white. The mixture was then filtered, and the solid was washed with a sufficient amount of pure water and then dried at 110° C. The thus-obtained dry powder was calcined at 600° C. to give β-type ferrosilicate.

X-ray diffraction measurement of the thus-obtained β-type ferrosilicate showed a X-ray diffraction pattern shown in Table 1. Ultraviolet-visible light absorption measurement revealed that the content of isolated iron ion was 78%.

The silicate catalysts prepared in Examples 1 to 3 and Comparative Examples 1 and 2 were tested for their performance for reduction of nitrogen oxides. The test results of fresh samples are shown in Table 3, and the test results of samples after aging are shown in Table 4.

TABLE 3

| Catalyst | SiO$_2$/Fe$_2$O$_3$ | SiO$_2$/Al$_2$O$_3$ | Reaction temperature | | | |
|---|---|---|---|---|---|---|
| | | | 150° C. | 200° C. | 250° C. | 400° C. |
| Example 1 | 166 | 41 | 17 | 74 | 91 | 80 |
| Example 2 | 137 | 71 | 15 | 70 | 90 | 84 |
| Example 3 | 66 | 72 | 25 | 80 | 93 | 85 |
| Com. Ex. 1 | (54)* | 36 | 8 | 28 | 71 | 94 |
| Com. Ex. 2 | 69 | 64 | 22 | 65 | 85 | 93 |

*Iron ingredient was supported by impregnation at a later stage

TABLE 4

| Catalyst | SiO$_2$/Fe$_2$O$_3$ | SiO$_2$/Al$_2$O$_3$ | Reaction temperature | | | |
|---|---|---|---|---|---|---|
| | | | 150° C. | 200° C. | 250° C. | 400° C. |
| Example 1 | 166 | 41 | 5 | 42 | 84 | 81 |
| Example 2 | 137 | 71 | 5 | 32 | 81 | 73 |
| Example 3 | 66 | 72 | 6 | 38 | 83 | 82 |
| Com. Ex. 1 | (54)* | 36 | 3 | 13 | 50 | 87 |
| Com. Ex. 2 | 69 | 64 | 6 | 24 | 66 | 90 |

*Iron ingredient was supported by impregnation at a later stage

With regard to the silicate catalysts prepared in Examples 1 to 3 and Comparative Examples 1 and 2, the relation of the ratio of isolated iron ion to the total iron as determined by ultraviolet-visible light absorption measurement, the ratio of isolated iron ion having a tetrahedral coordination to the total isolated iron ion as determined by electron spin resonance measurement, and the performance for reduction (purification ratio) of nitrogen oxides at lower temperature (below 250° C.) is shown in Tables 5 (before aging) and 6 (after aging), respectively.

TABLE 5

| Catalyst | (a) | (b) | (c) | (d) | SiO$_2$/Fe$_2$O$_3$ | SiO$_2$/Al$_2$O$_3$ | Reduction ratio 200° C. | Reduction ratio 250° C. |
|---|---|---|---|---|---|---|---|---|
| Example 1 | 1.1 | 0.98 | 0.36 | 0.35 | 166 | 41 | 42 | 84 |
| Example 2 | 1.4 | 0.96 | — | — | 137 | 71 | 32 | 81 |
| Example 3 | 2.9 | 0.94 | 0.63 | 0.59 | 66 | 72 | 38 | 83 |
| Com. Ex. 1 | (3.4)* | 0.38 | 0.47 | 0.17 | (54)* | 36 | 13 | 50 |
| Com. Ex. 2 | 2.7 | 0.78 | — | — | 69 | 64 | 24 | 66 |

TABLE 6

| Catalyst | (a) | (b) | (c) | (d) | SiO$_2$/Fe$_2$O$_3$ | SiO$_2$/Al$_2$O$_3$ | Reduction ratio 200° C. | Reduction ratio 250° C. |
|---|---|---|---|---|---|---|---|---|
| Example 1 | 1.1 | 0.74 | 0.26 | 0.19 | 166 | 41 | 42 | 84 |
| Example 2 | 1.4 | 0.69 | — | — | 137 | 71 | 32 | 81 |
| Example 3 | 2.9 | 0.50 | 0.40 | 0.20 | 66 | 72 | 38 | 83 |
| Com. Ex. 1 | (3.4)* | 0.34 | 0.37 | 0.13 | (54)* | 36 | 13 | 50 |
| Com. Ex. 2 | 2.7 | 0.48 | — | — | 69 | 64 | 24 | 66 |

Note
(a) Mol ratio of Fe content, Fe/(Si + Al + Fe) by mol
(b) Ratio of isolated Fe ion to total contained Fe, (isolated Fe$^{3+}$/total Fe)
(c) Ratio of isolated Fe ion with tetrahedral coordination to total isolated Fe ion, (isolated Fe$^{3+}$ with tetrahedral coordination/total isolated Fe$^{3+}$)
(d) Ratio of isolated Fe ion with tetrahedral coordination to total contained Fe, (isolated Fe$^{3+}$ with tetrahedral coordination/total Fe)

The following examples 4 to 6 are drawn to the preparation and evaluation of β-type ferrosilicate 2 of the present invention.

Example 4

9.43 g of iron nitrate nine hydrates was dissolved in 264 g of an aqueous 35% TEAOH solution. To the thus-obtained solution, 214 g of tetraethylorthosilicate (TEOS) was added, and the mixture was thoroughly stirred at room temperature to be thereby hydrolyzed. The produced ethanol was evaporated and then a required amount of water was evaporated. To the reaction mixture, 21.45 g of 48% hydrofluoric acid was added, and the resulting mixture was thoroughly mixed in a mortar. The reaction mixture was put into a stainless steel autoclave, and was heated at 150° C. for 240 hours to be thereby crystallized. The composition of the reaction mixture was 62SiO$_2$:Fe$_2$O$_3$:31HF:37.8TEAOH:465H$_2$O. The crystallized slurry mixture was white. The mixture was then filtered, and the solid was washed with a sufficient amount of pure water and then dried at 110° C. The thus-obtained dry powder was calcined at 600° C. for 2 hours in an air stream.

X-ray diffraction measurement of the thus-obtained β-type ferrosilicate showed a x-ray diffraction pattern shown in Table 1. ICP atomic emission spectrochemical analysis showed that the SiO$_2$/Al$_2$O$_3$ mol ratio was 4743 and the SiO$_2$/Fe$_2$O$_3$ mol ratio was 62. The crystal particles had an average diameter of about 7.5 μm.

Figure 4:
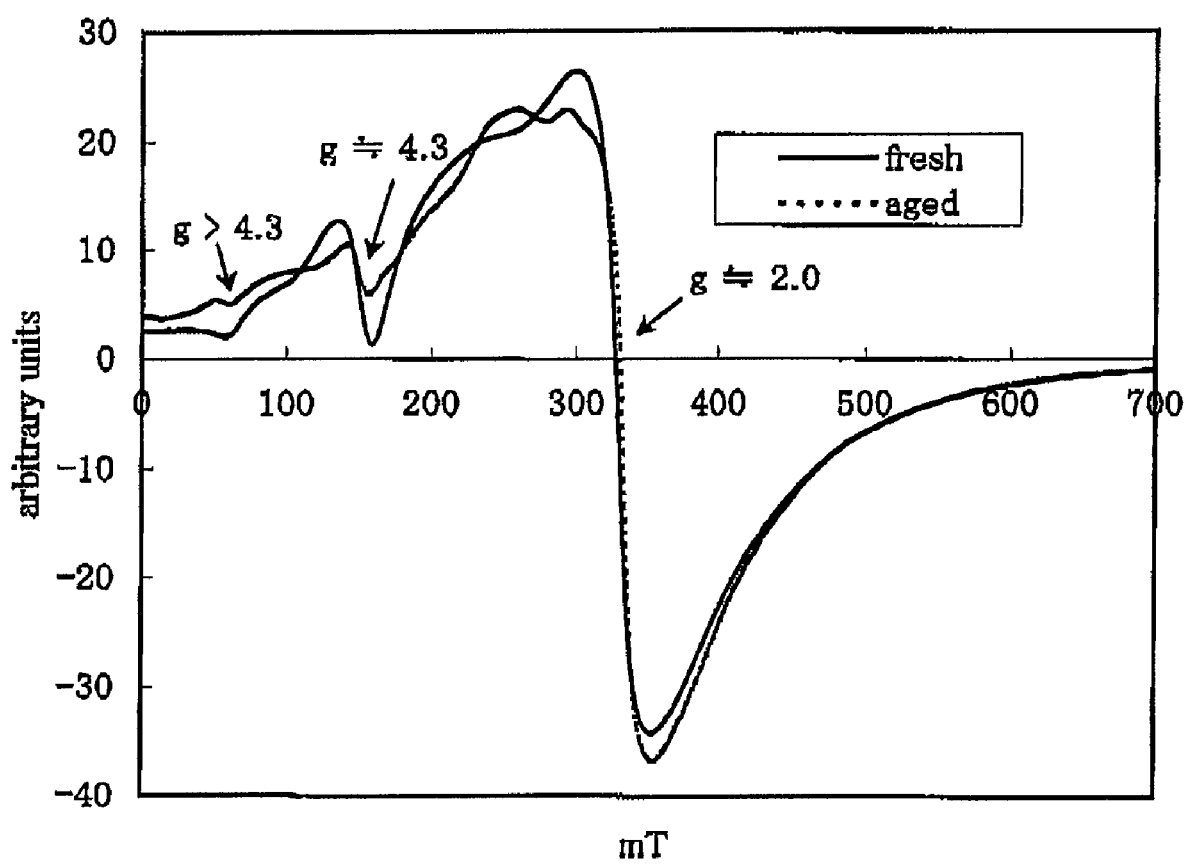
FIG. 4 is an electron spin resonance (ESR) spectrum of β-type ferrosilicate 2 prepared in Example 4, as analyzed before and after aging.
Figure 6:
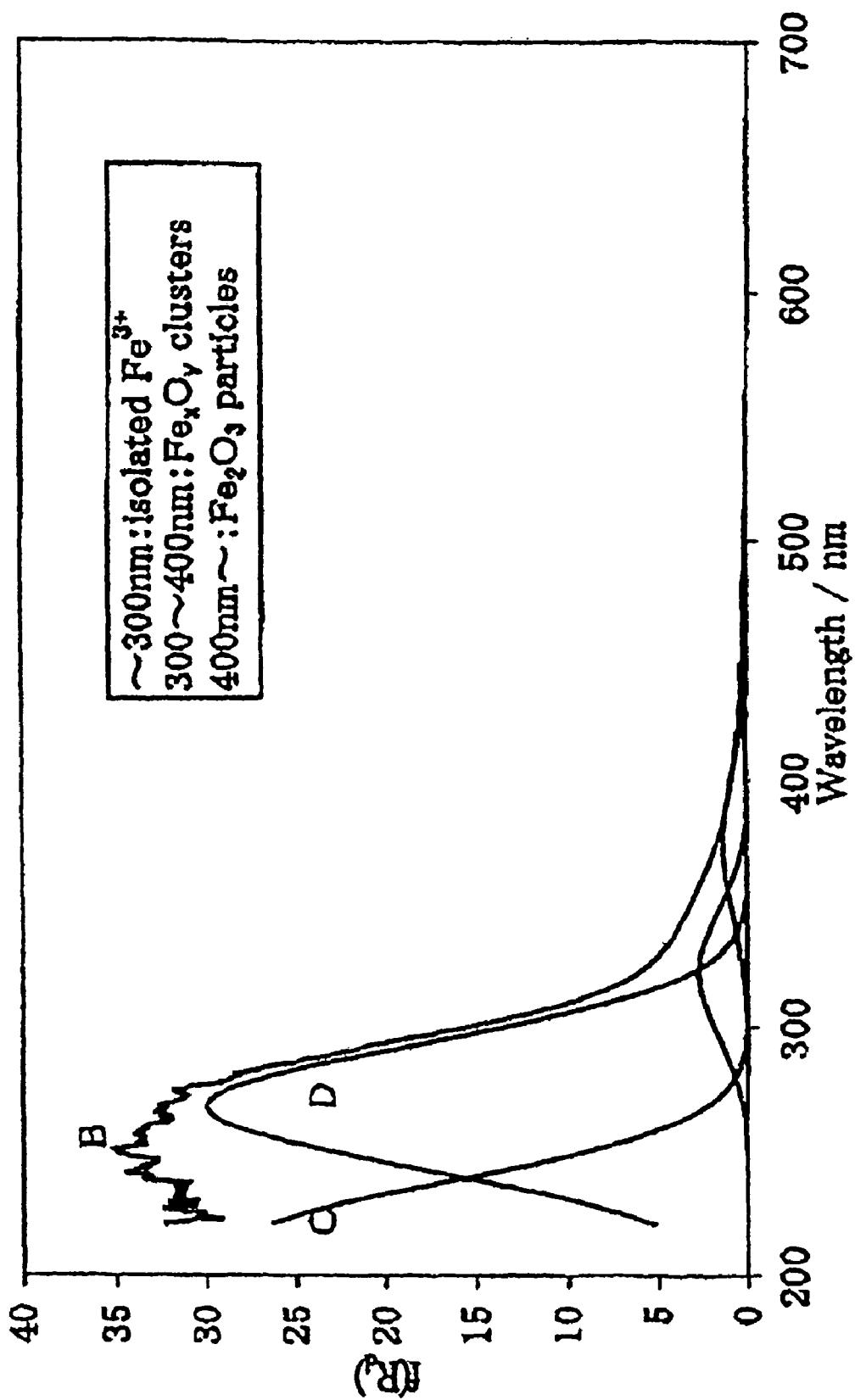
FIG. 6 is an ultraviolet-visible light absorption spectrum of β-type ferrosilicate 2 prepared in Example 4.

An ultraviolet-visible light absorption spectrum of the β-type ferrosilicate 2 as obtained before hydrothermal aging is shown in FIG. 6. An electron spin resonance (ESR) spectrum of the β-type ferrosilicate 2, as analyzed before and after hydrothermal aging, is shown in FIG. 4.

Example 5

Each fixed amounts of #3 sodium silicate (SiO$_2$: 402 g/l, Na$_2$O: 129 g/l, Al$_2$O$_3$: 0.22 g/l), 98% sulfuric acid, water and iron nitrate nine hydrates were mixed together, and the resulting gel was subjected to a solid-liquid separation using Buchner funnel. The gel was thoroughly washed with a sufficient amount of pure water. Each fixed amounts of water, TEAOH and NaOH were added to the washed gel and the mixture was thoroughly stirred. The obtained reaction mixture had the following composition, 1965SiO$_2$:Al$_2$O$_3$:30.05Fe$_2$O$_3$:98.27Na$_2$O:786.2TEAOH:19654H$_2$O. The reaction mixture was put into a stainless steel autoclave, and was heated at 150° C. for 90 hours while being rotated to be thereby crystallized. The crystallized slurry mixture was white. The mixture was then filtered, and the solid was washed with a sufficient amount of pure water and then dried at 110° C. The thus-obtained dry powder was calcined at 600° C. for 2 hours.

Example 6

The similar procedures described in Example 4 except for that the composition of the reaction mixture was changed to be 500SiO$_2$:Al$_2$O$_3$:7.69Fe$_2$O$_3$:250HF:305TEAOH:3750H$_2$O, and aluminum nitrate was used was subjected to prepare a reaction mixture. The reaction mixture was put into a stainless steel autoclave, and was heated at 150° C. for 240 hours to be thereby crystallized. The crystallized slurry mixture was white. The mixture was then filtered, and the solid was washed with pure water and then dried at 110° C. The thus-obtained dry powder was calcined at 600° C. for 2 hours in air stream.

Comparative Example 3

The same procedures described in Example 4 except for that the composition of the reaction mixture was changed to be 70SiO$_2$:Al$_2$O$_3$:Fe$_2$O$_3$:35HF:42TEAOH:490H$_2$O was used was subjected. The reaction mixture was put into a stainless steel autoclave, and was heated at 150° C. for 240 hours to be thereby crystallized. The crystallized slurry mixture was white. The mixture was then filtered, and the solid was washed with pure water and then dried at 110° C. The thus-obtained dry powder was calcined at 600° C. for 2 hours.

Comparative Example 4

β-type zeolite ("HSZ-940NHA" available from Tosoh Corporation) having an $SiO_2/Al_2O_3$ mol ratio of 40 was calcined at 600° C. in a stream of dry air. X-ray diffraction measurement of the calcined β-type zeolite showed an X-ray diffraction pattern shown in Table 2. ICP atomic emission spectrochemical analysis revealed that the $SiO_2/Al_2O_3$ mol ratio was 40. The β-type zeolite was impregnated with a precisely weighted aqueous solution of $Fe(NO_3)_3$.9hydrate so that 3% by weight of iron was supported on the zeolite. The thus-obtained zeolite powder was calcined at 500° C. in the air.

Figure 5:
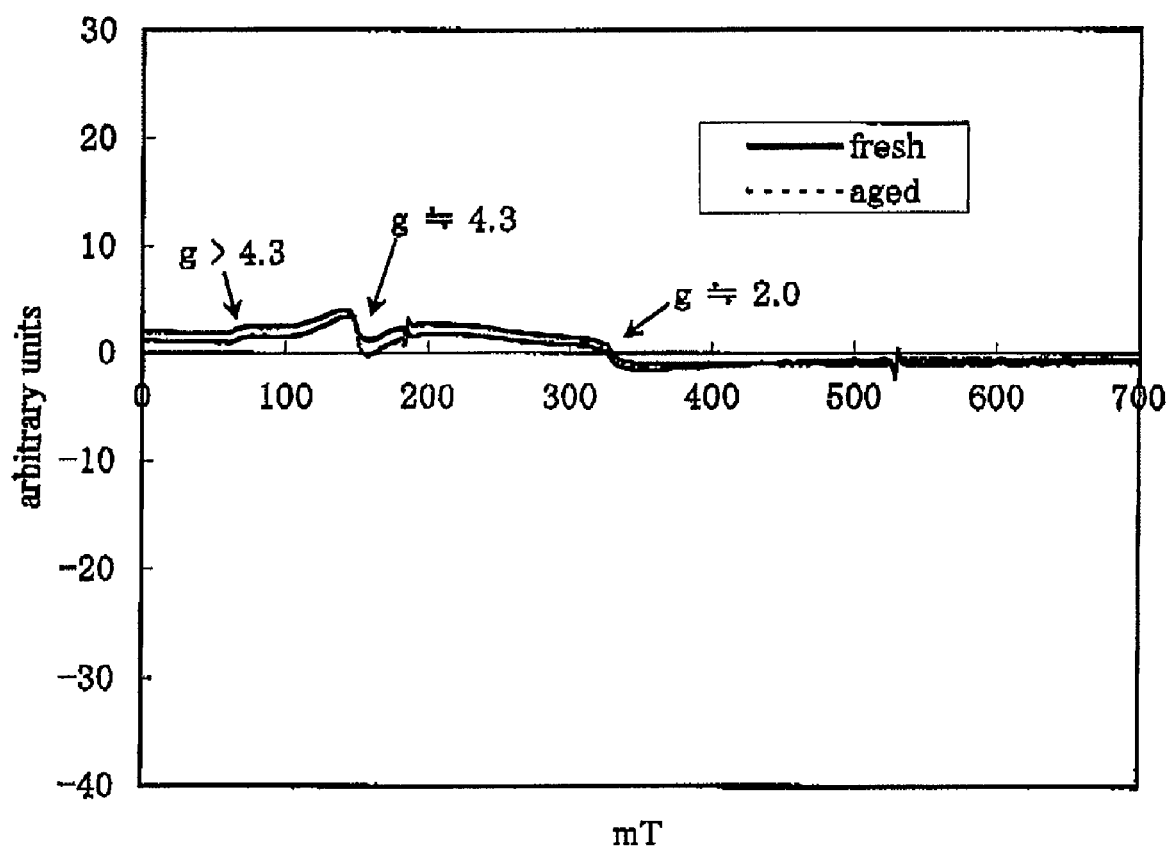
FIG. 5 is an electron spin resonance (ESR) spectrum of iron-loaded β zeolite prepared in Comparative Example 4, as analyzed before and after aging.

An electron spin resonance (ESR) spectrum of the thus-obtained β-type ferrosilicate, as analyzed before and after the hydrothermal aging, is shown in FIG. 5.

Comparative Example 5

1.26 g of aluminum hydroxide, 8.36 g of iron nitrate, 62.8 g of amorphous silica powder ("Nipsil VN-3" available from TOSOH SILICA CORPORATION) and 172 g of water were added to 235 g of an aqueous 35% TEAOH solution, and the mixture was thoroughly stirred. The composition of the reaction mixture was $90SiO_2:Al_2O_3:Fe_2O_3:54TEAOH:1800H_2O$. The reaction mixture was put into a stainless steel autoclave, and was heated and maintained at 150° C. for 96 hours to be thereby crystallized. The crystallized slurry mixture was white. The mixture was then filtered, and the solid was washed with a sufficient amount of pure water and then dried at 110° C. The thus-obtained dry powder was calcined at 600° C. to give β-type ferrosilicate.

The ferrosilicate catalysts prepared in Examples 4 to 6 and Comparative Examples 3 to 5 were tested for their performance for reduction of nitrogen oxides. The tested results of fresh ferrosilicates as measured before hydrothermal aging are shown in Table 7, and the tested results of ferrosilicates as measured after hydrothermal aging are shown in Table 8.

TABLE 7

| Catalyst | $SiO_2/Fe_2O_3$ | $SiO_2/Al_2O_3$ | Reaction temperature | | | |
|---|---|---|---|---|---|---|
| | | | 150° C. | 200° C. | 250° C. | 400° C. |
| Example 4 | 62 | 4743 | 22 | 82 | 94 | 81 |
| Example 5 | 25 | 820 | 47 | 83 | 94 | 84 |
| Example 6 | 51 | 397 | 34 | 84 | 96 | 96 |
| Com. Ex. 3 | 66 | 72 | 25 | 80 | 93 | 85 |
| Com. Ex. 4 | (54)* | 36 | 8 | 28 | 71 | 94 |
| Com. Ex. 5 | 69 | 64 | 22 | 65 | 85 | 93 |

*Iron ingredient was supported by impregnation at a later stage

TABLE 8

| Catalyst | $SiO_2/Fe_2O_3$ | $SiO_2/Al_2O_3$ | Reaction temperature | | | |
|---|---|---|---|---|---|---|
| | | | 150° C. | 200° C. | 250° C. | 400° C. |
| Example 4 | 62 | 4743 | 21 | 68 | 84 | 79 |
| Example 5 | 25 | 820 | 20 | 64 | 84 | 80 |
| Example 6 | 51 | 397 | 24 | 73 | 91 | 80 |
| Com. Ex. 3 | 66 | 72 | 6 | 38 | 83 | 82 |
| Com. Ex. 4 | (54)* | 36 | 3 | 13 | 50 | 87 |
| Com. Ex. 5 | 69 | 64 | 6 | 24 | 66 | 90 |

*Iron ingredient was supported by impregnation at a later stage

With regard to the silicate catalysts prepared in Examples to 6 and Comparative Examples 3 to 5, the ratio of isolated iron ion $Fe^{3+}$ to the total iron as determined by ultraviolet-visible light absorption measurement, the ratio of isolated iron ion having a tetrahedral coordination to the total isolated iron ion as determined by electron spin resonance measurement, and the purification ratio of nitrogen oxide as tested at a relatively low temperature (200° C., 250° C.) were measured. The obtained results of ferrosilicates are shown in Table 9 (before aging) and Table 10 (after aging), respectively,

TABLE 9

| Catalyst | (a) | (b) | (c) | (d) | (e) | $SiO_2/Fe_2O_3$ | $SiO_2/Al_2O_3$ | Reduction ratio | |
|---|---|---|---|---|---|---|---|---|---|
| | | | | | | | | 200° C. | 250° C. |
| Example 4 | 3.1 | 0.90 | 0.84 | 0.76 | 2.4 | 62 | 4743 | 68 | 84 |
| Example 6 | 3.8 | 0.91 | 0.88 | 0.80 | 3.0 | 51 | 397 | 73 | 91 |
| Com. Ex. 3 | 2.9 | 0.94 | 0.63 | 0.59 | 1.7 | 66 | 72 | 38 | 83 |
| Com. Ex. 4 | 3.4 | 0.38 | 0.47 | 0.17 | 0.6 | (54)* | 36 | 13 | 50 |

*Iron ingredient was supported by impregnation at a later stage

TABLE 10

| Catalyst | (a) | (b) | (c) | (d) | (e) | $SiO_2/Fe_2O_3$ | $SiO_2/Al_2O_3$ | Reduction ratio | |
|---|---|---|---|---|---|---|---|---|---|
| | | | | | | | | 200° C. | 250° C. |
| Example 4 | 3.1 | 0.59 | 0.92 | 0.54 | 1.73 | 62 | 4743 | 68 | 84 |
| Example 6 | 3.8 | 0.52 | 0.86 | 0.45 | 1.7 | 51 | 397 | 73 | 91 |
| Com. Ex. 3 | 2.9 | 0.5 | 0.4 | 0.2 | 0.60 | 66 | 72 | 38 | 83 |
| Com. Ex. 4 | 3.4 | 0.35 | 0.37 | 0.13 | 0.44 | (54)* | 36 | 13 | 50 |

*Iron ingredient was supported by impregnation at a later stage
Note
(a) Mol ratio of Fe content, Fe/(Si + Al + Fe) by mol
(b) Ratio of isolated Fe ion to total contained Fe, (isolated $Fe^{3+}$/total Fe)
(c) Ratio of isolated Fe ion with tetrahedral coordination to total isolated Fe ion, (isolated $Fe^{3+}$ with tetrahedral coordination/total isolated $Fe^{3+}$)
(d) Ratio of isolated Fe ion with tetrahedral coordination to total contained Fe, (isolated $Fe^{3+}$ with tetrahedral coordination/total Fe)
(e) Mol % of isolated Fe ion with tetrahedral coordination, isolated $Fe^{3+}$/(Si + Al + Fe) mol %

Figure 7:
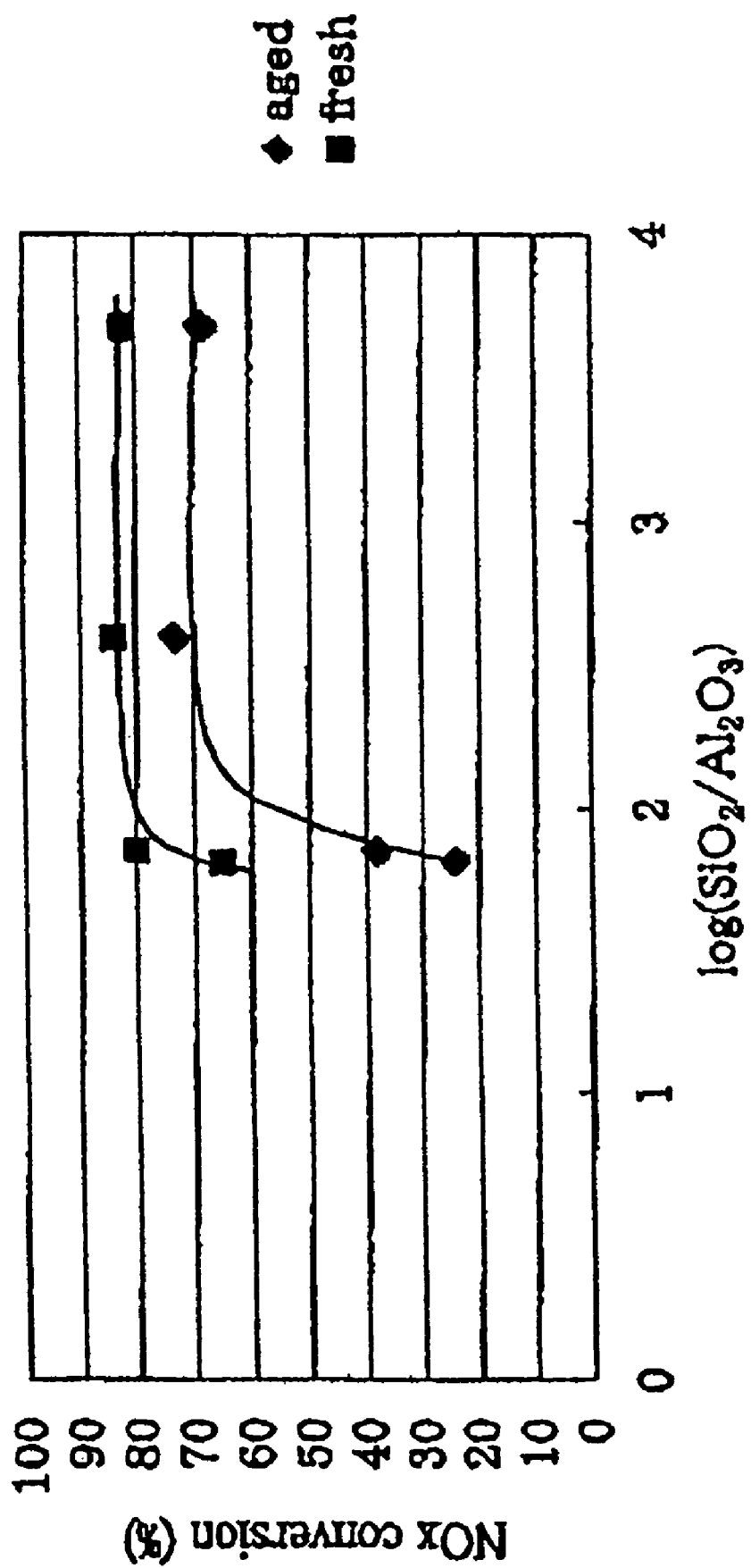
FIG. 7 is a graph showing a relationship between the nitrogen oxide purification ratio at 200° C. and log(SiO$_2$/Al$_2$O$_3$).

A graph showing a relationship between the reduction ratio of nitrogen oxide (NOx conversion) at 200° C. and $\log(SiO_2/Al_2O_3)$ is shown in FIG. 7. As seen from FIG. 7, the purification ratio of nitrogen oxide (NOx conversion) as measured at 200° C. after hydrothermal aging increased sharply at a $\log(SiO_2/Al_2O_3)$ of 2 or larger. The $\log(SiO_2/Al_2O_3)$ of about 2 is a critical point for the NOx conversion.

The invention claimed is:

1. A process for reducing a nitrogen oxide selected from nitrogen monoxide, nitrogen dioxide, and mixtures thereof comprising reacting the nitrogen oxide with at least one reducing agent selected from the group consisting of ammonia, urea, and an organic amine in the presence of a catalyst comprising a crystalline silicate containing iron in a β-framework structure wherein a $SiO_2/Fe_2O_3$ mole ratio of the crystalline silicate is in the range of 20 to 300, and at least 80% of the contained iron is an isolated iron ion $Fe^{3+}$ and at least 20% of the contained iron is an isolated iron ion $Fe^{3+}$ having a tetrahedral coordination, whereby the nitrogen oxides are selectively reduced.

2. A process for reducing a nitrogen oxide selected from nitrogen monoxide, nitrogen dioxide, and a mixture thereof comprising reacting the nitrogen oxide with at least one reducing agent selected from the group consisting of ammonia, urea, and an organic amine in the presence of a catalyst comprising a crystalline silicate containing iron and aluminum in an iron-containing β-framework structure wherein a $SiO_2/Fe_2O_3$ mole ratio of the crystalline silicate is in the range of 20 to 300 and $\log(SiO_2/Al_2O_3)$ by mole of the crystalline silicate is at least 2, and at least 60% of the contained iron is an isolated iron ion $Fe^{3+}$ having a tetrahedral coordination, whereby the nitrogen oxides are selectively reduced.

3. The process according to claim 2, wherein at least 70% of the isolated iron ion $Fe^{3+}$ has a tetrahedral coordination.

4. The process according to claim 2, wherein a content of the isolated iron ion $Fe^{3+}$ having a tetrahedral coordination as expressed by the ratio $Fe^{3+}/(Si+Al+Fe)$ by mole is at least 2%.

* * * * *